2 Sheets—Sheet 1.
J. B. CUZNER.
Animal Trap.
No. 197,018.        Patented Nov. 13, 1877.
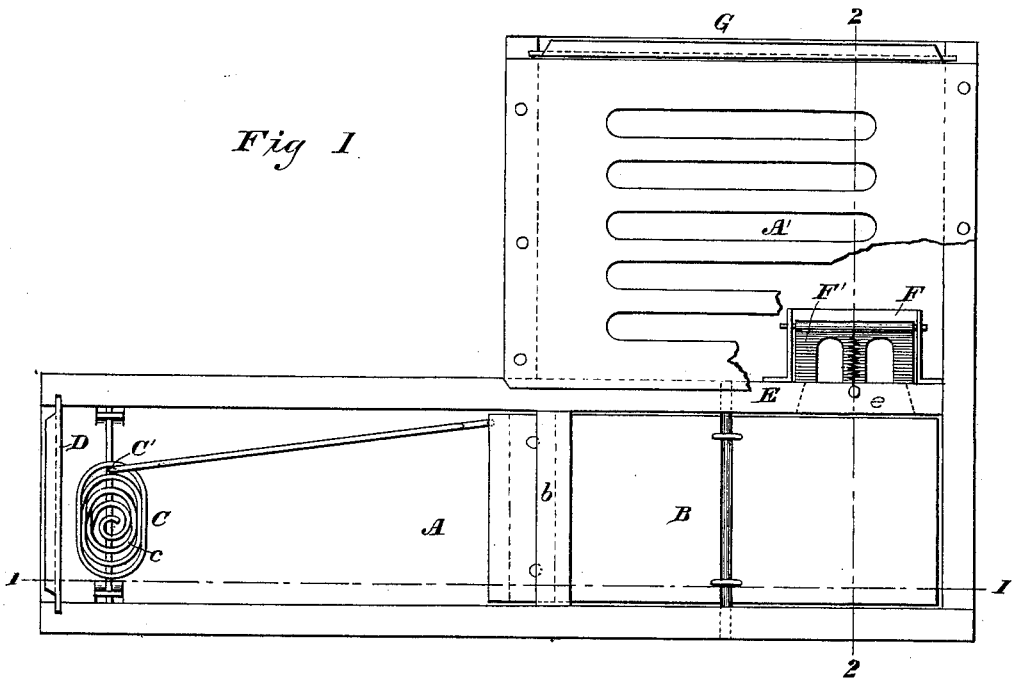
Fig 1.
Fig 2.
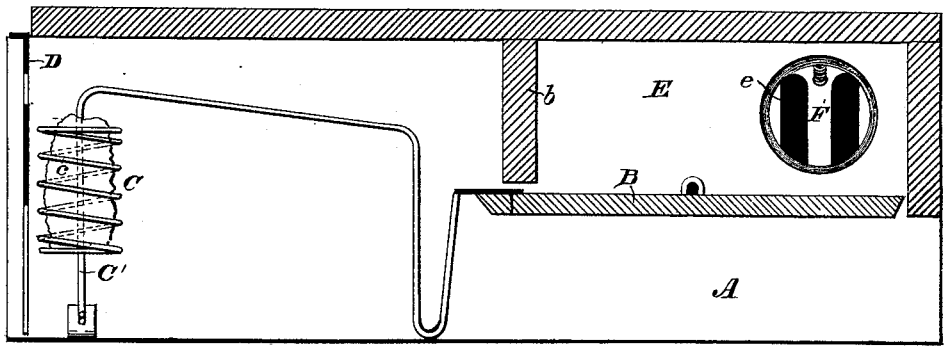
WITNESSES
Wm A Skinkle
G. W. Breck
INVENTOR
John B Cuzner
By his Attorneys
Baldwin, Hopkins & Peyton 2 Sheets—Sheet 2.

J. B. CUZNER.
Animal Trap.

No. 197,018. Patented Nov. 13, 1877.

WITNESSES
Wm A Skinkle
G. W. Brick

INVENTOR
John B Cuzner
By his Attorneys.
Baldwin, Hopkins & Peyton

UNITED STATES PATENT OFFICE.

JOHN B. CUZNER, OF BRIDGEPORT, CONNECTICUT, ASSIGNOR TO HIMSELF AND CARLOS B. CURTISS, OF SAME PLACE.

IMPROVEMENT IN ANIMAL-TRAPS.

Specification forming part of Letters Patent No. 197,018, dated November 13, 1877; application filed September 17, 1877.

*To all whom it may concern:*

Be it known that I, JOHN B. CUZNER, of Bridgeport, in the county of Fairfield and State of Connecticut, have invented certain new and useful Improvements in Animal-Traps, of which the following is a specification:

My invention relates to traps of that class in which the animal enters beneath a drop gate or door held open by a catch connected with the bait hook or receptacle, the animal, in its attempts to seize the bait, tripping or releasing the catch, and allowing the door to drop or close behind it, and when so entrapped, in its endeavors to escape, is directed into another compartment or cage, in order to utilize its weight for resetting the trap.

The object of my invention is to simplify and cheapen the construction of traps of this class while rendering them more efficient.

The subject-matter claimed hereinafter specifically will be designated.

Figure 3:
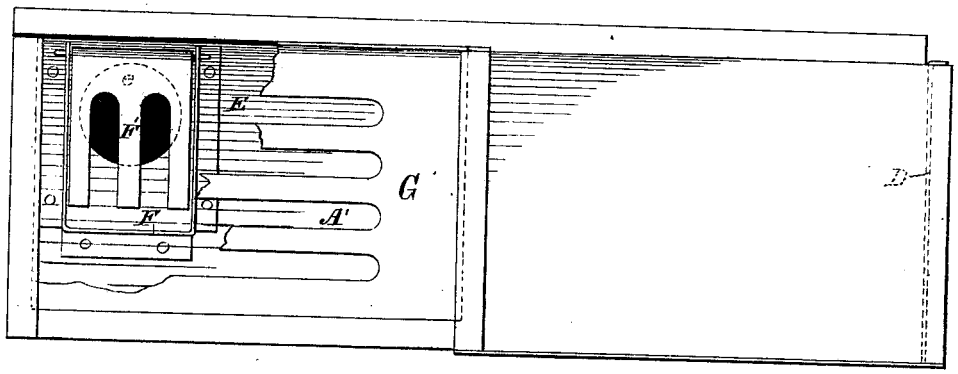
Figure 4:
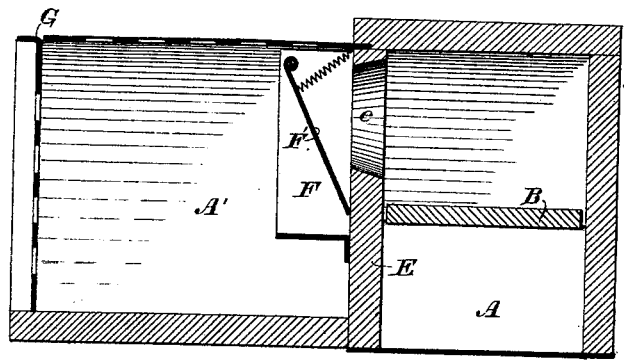
Figure 5:
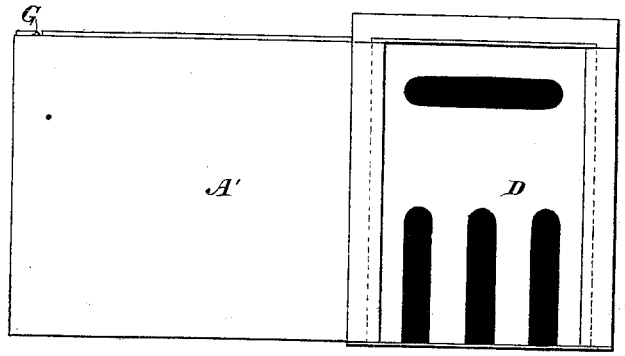

In the accompanying drawings, Figure 1 represents a top or plan view of my improved trap, with the cover of the passage-way removed and the roof of the cage proper partly broken away, the better to show the parts. Fig. 2 is a vertical longitudinal section therethrough, on the line 1 1 of Fig. 1; Fig. 3, a view, partly in section, of the cage side of the trap, to show the drop-gate covering the opening leading to the cage. Fig. 4 is a vertical cross-section through the trap, on the line 2 2 of Fig. 1; and Fig. 5, a rear view of the same.

The trap is composed of two compartments— a passage-way, A, in which the animal is caught, and a cage, A', into which it is allowed to escape after being caught, in order to reset the trap and give it a capacity of catching and confining more than one animal without necessitating resetting by hand.

Near the entrance of the trap, in the passage-way A, is pivoted or hung a drop gate or door, B, the inner end of which is weighted to enable it to drop quickly to close the passage when its support is tripped or released by the animal. The upward movement of the inner end of the door is limited by a block or crosspiece, $b$.

At the inner end of the passage is located the bait-receptacle C, which consists of a skeleton wire cup, $c$, supported upon a wire, C', which wire is bent so as to have pivot-bearings on each side of the passage, beneath the receptacle, and then rises vertically and extends forward, being hook-shaped at its forward end, as shown in Fig. 2, whereby the hooked end forms a catch or support for the inner end of the drop gate or door, by which means the door may be held open until the catch is tripped or released from under it by being rocked on its pivots when the animal attempts to seize the bait. I thus avoid the trouble of suspending the bait from a hook, as usual, while leaving it in plain view, and also prevent its removal.

The end of the passage immediately in rear of this receptacle is closed by a slotted sliding door, D, which admits sufficient light to expose the bait to the view of the entering animal, and affords a ready means of access to the receptacle when desired.

An opening, $e$, leading from the passageway into the cage, is made in the partition E, near the front of the trap and above the door B. Surrounding the opening, inside the cage, is a box, F, in which is pivoted a drop-gate, F', in such manner that the animal, in escaping into the cage, is compelled to raise the gate, which immediately closes behind it and prevents its return.

A slotted sliding door, G, admits light and affords access to the interior of the cage, the roof of which is also slotted to admit light to attract the animal toward the opening when caught in the passage-way.

The operation of the trap is as follows: The door being open, as shown in Fig. 2, the animal enters the passage beneath it and passes to the bait-receptacle, which, when the animal attempts to seize the bait, rocks on its pivots, disengaging the hooked end of the wire from beneath the door, and allowing it to drop, thereby closing the passage and preventing escape of the animal by way of entrance. As the animal cannot escape in a forward direction it turns back, and is attracted by the light to the opening above the door, the door being now inclined directly toward it, and up which the animal passes. As soon as the animal passes beyond the line of the pivots of the door its weight overcomes that of the inner end of the door, causing said end to fly upward against the cross-piece $b$, and above the hooked end of the wire, which re-engages with the door, and the trap is thus reset. The animal, being now thoroughly frightened and prevented from returning to the passage-way, leaps through the opening into the cage, raising the drop-gate in its passage, which closes behind it, thus preventing all escape, and leaving the trap in a condition to repeat the operation when the next animal enters.

I claim as of my own invention—

1. The bait-holder or receptacle for animal-traps, constructed as described, consisting of a skeleton cup mounted on a pivoted support, an extension of which constitutes a catch or device by which the door or gate of the trap is operated.

2. The improved animal-trap hereinbefore described, consisting of the door or gate pivoted in the passage-way, the bait-holder acting upon the door, the cross-piece to limit the upward movement of said door and prevent the return of the animal after resetting the trap, the drop-gate in the opening leading to the cage, and the cage proper, these members being constructed and arranged substantially as hereinbefore set forth, whereby, when the door is closed, it affords a direct passage for the animal to the cage.

In testimony whereof I have hereunto subscribed my name.

JOHN B. CUZNER.

Witnesses:
ALFRED B. BEERS,
CALVIN BEACH.